(12) United States Patent
Anderson et al.

(10) Patent No.: US 7,111,012 B1
(45) Date of Patent: Sep. 19, 2006

(54) SYSTEM AND METHOD FOR DATA TRANSFORMATION OF DEVICE DATABASES FOR FORWARD COMPATIBILITY

(75) Inventors: Douglas Anderson, Edmund, WA (US); Kenneth Y. Ogami, Bothell, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 515 days.

(21) Appl. No.: 10/226,778

(22) Filed: Aug. 23, 2002

(51) Int. Cl.
*G06F 17/30* (2006.01)

(52) U.S. Cl. ............... 707/102; 707/3; 707/10; 707/101; 715/523; 715/513

(58) Field of Classification Search ......... 707/1, 707/10, 100, 101, 102, 104.1, 203, 201, 3; 715/513, 523, 500.1; 717/173
See application file for complete search history.

(56) References Cited

U.S. PATENT DOCUMENTS

| | | | |
|---|---|---|---|
| 5,493,671 A * | 2/1996 | Pitt et al. ............... | 707/203 |
| 5,740,405 A * | 4/1998 | DeGraaf ................ | 703/22 |
| 6,658,625 B1 * | 12/2003 | Allen .................... | 715/523 |
| 6,799,299 B1 * | 9/2004 | Li et al. ................. | 715/513 |
| 2002/0184401 A1 * | 12/2002 | Kadel et al. ............. | 709/315 |
| 2003/0023755 A1 * | 1/2003 | Harris et al. ............. | 709/246 |
| 2003/0061349 A1 * | 3/2003 | Lo et al. ................ | 709/225 |
| 2003/0110464 A1 * | 6/2003 | Davidson et al. .......... | 716/17 |

* cited by examiner

*Primary Examiner*—Cam-Y Truong

(57) ABSTRACT

A system and method for transforming databases to maintain compatibility with an associated software application. An initial database associated with an application is formatted using a description language that is transformable by a stylesheet language. After modification of the structure or values of the initial database, a translator using a stylesheet language is applied to the database to transform the database so that it retains compatibility with a revised or updated application. When the application itself is modified, the translator can be used to maintain compatibility between existing databases and the revised application. In one embodiment, the application can be used to program an electronic device.

19 Claims, 8 Drawing Sheets

SYSTEM AND METHOD FOR DATA TRANSFORMATION OF DEVICE DATABASES FOR FORWARD COMPATIBILITY

FIELD OF THE INVENTION

Embodiments of the present invention relate to the field of software development. More particularly, embodiments of the present invention relate to a system and method for maintaining compatibility between revised databases and their associated applications.

BACKGROUND ART

Many software programs include a database that provides a set of data that is combined with user input to produce a desired output. Examples of such databases are dictionaries, catalogs, and component libraries.

Generally, the format of data used in a software application (e.g. a software tool for programming electronic devices) has been very tightly coupled to a particular version. If the software tool was modified in such a way that required changes in the data structure, such as additional and/or different fields and information, then any data that was based on the old software tool would not be compatible with the updated software version. As a result, a customer's existing database may not be carried forward and used with subsequent versions of a software tool. Revision of the data structure for compatibility has been a costly and/or tedious process.

The tight coupling between a database and its application provides rapid execution; however, in interactive applications execution speed is not a priority. Also, modern microprocessors provide significantly more power than those of just a few years ago.

Markup languages such as Extensible Markup Language, and other document oriented languages have typically not been used in computationally demanding environments. However, their resemblance to natural language and ability to be transformed (e.g., by the application of stylesheets) make them attractive for use in software that is subject to frequent revision.

SUMMARY OF INVENTION

Accordingly, embodiments of the present invention provide a system and method for revising database components of software. Extensible Markup Language (XML) and Extensible Stylesheet Language (XSL) stylesheets are used to define a new markup language for developing device databases that can be efficiently revised to conform to changes in the software.

A system and method for transforming databases to maintain compatibility with an associated application are disclosed. An initial database associated with a software application is formatted using a description language that is transformable by a stylesheet language. After modification of the structure or values of the initial database, a translator using a stylesheet language is applied to the database to transform the database so that it retains compatibility with a revised version of the application. When the application itself is modified, the translator can be used to maintain compatibility between existing databases and the revised application. In one embodiment, the application can be used to perform electronic design and programming of the design into an electronic circuit device.

In one embodiment, extensible markup language (XML) is used to create a description language for User Modules, Device Modules and project descriptions for an integrated design environment (IDE) software application. A translator using extensible stylesheet language (XSL) is provided. Upon modification of the Device Modules or User Modules, the translator is applied to the modified databases associated with the Device Modules or User Modules to render the databases in a format expected by the application. The revised databases may then be distributed.

In another embodiment, the translator is incorporated in an IDE software application as a module that can be updated to maintain compatibility with existing databases and new versions of the IDE. In this embodiment, distribution of new databases is not required.

DESCRIPTION OF THE PREFERRED EMBODIMENTS

In the following detailed description of the present invention, a system and method for transforming databases to maintain compatibility with an associated application; numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the disclosure of the present invention, terms such as "processing" or "computing" or "calculating" or "computing" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's registers or memories or other such information storage, transmission or display devices.

Figure 1A:
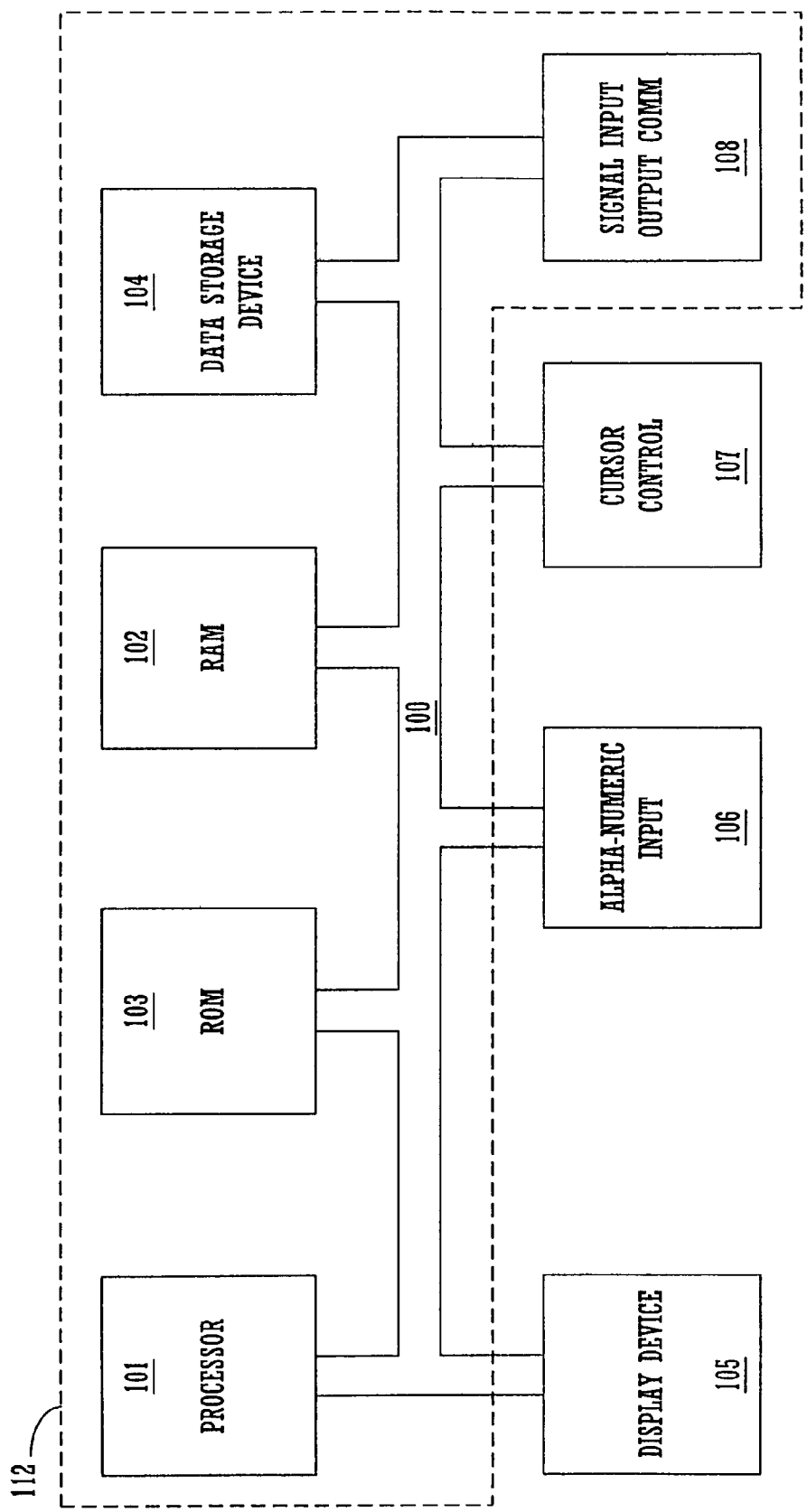
FIG. 1A is a diagram of a computer system portion of an environment in which embodiments of the present claimed invention may be practiced.

Refer to FIG. 1A which illustrates a computer system 112. In general, computer systems 112 used by the preferred embodiment of the present invention comprise a bus 100 for communicating information, a central processor 101 coupled with the bus for processing information and instructions, a random access memory 102 coupled with the bus 100 for storing information and instructions for the central processor 101, a read only memory 103 coupled with the bus 100 for storing static information and instructions for the processor 101, a data storage device 104 such as a magnetic or optical disk and disk drive coupled with the bus 100 for storing information and instructions, a display device 105 coupled to the bus 100 for displaying information to the computer user, an alphanumeric input device 106 including alphanumeric and function keys coupled to the bus 100 for communicating user input information and command selections to the central processor 101, cursor control device 107 coupled to the bus for communicating user input information and command selections to the central processor 101, and a communications port 108 coupled to the bus 100 communication with the system 112. The port 108 may be coupled to printer.

The display device 105 of FIG. 1A utilized with the computer system of the present invention may be a liquid crystal device, cathode ray tube or other display device suitable for creating graphic images and alphanumeric characters recognizable to the user. The cursor control device 107 allows the computer user to dynamically signal the two dimensional movement of a visible symbol (pointer) on a display screen of the display device 105. Many implementations of the cursor control device are known in the art including a trackball, mouse, joystick or special keys on the alphanumeric input device 105 capable of signaling movement of a given direction or manner of displacement. It is to be appreciated that the cursor means 107 also may be directed and/or activated via input from the keyboard using special keys and key sequence commands. Alternatively, the cursor may be directed and/or activated via input from a number of specially adapted cursor directing devices.

The computer system 112 of FIG. 1A may be used with an integrated design environment (IDE). An example of an IDE used for programming electronic devices is PSOC DESIGNER™ software, available from Cypress MicroSystems, Bothell, Wash. PSOC DESIGNER software contains three subsystems; a DEVICE EDITOR™ subsystem for configuring a target device, an APPLICATION EDITOR™ subsystem for editing source code, and a DEBUGGER subsystem for debugging the target device design. These three subsystems form the core programming application. The interface is split into several active windows that differ depending on which subsystem is being used. Additional details are described in U.S. patent application Ser. No. 10/033,027 (filed Oct. 22, 2001), which is incorporated herein by reference.

Figure 1B:
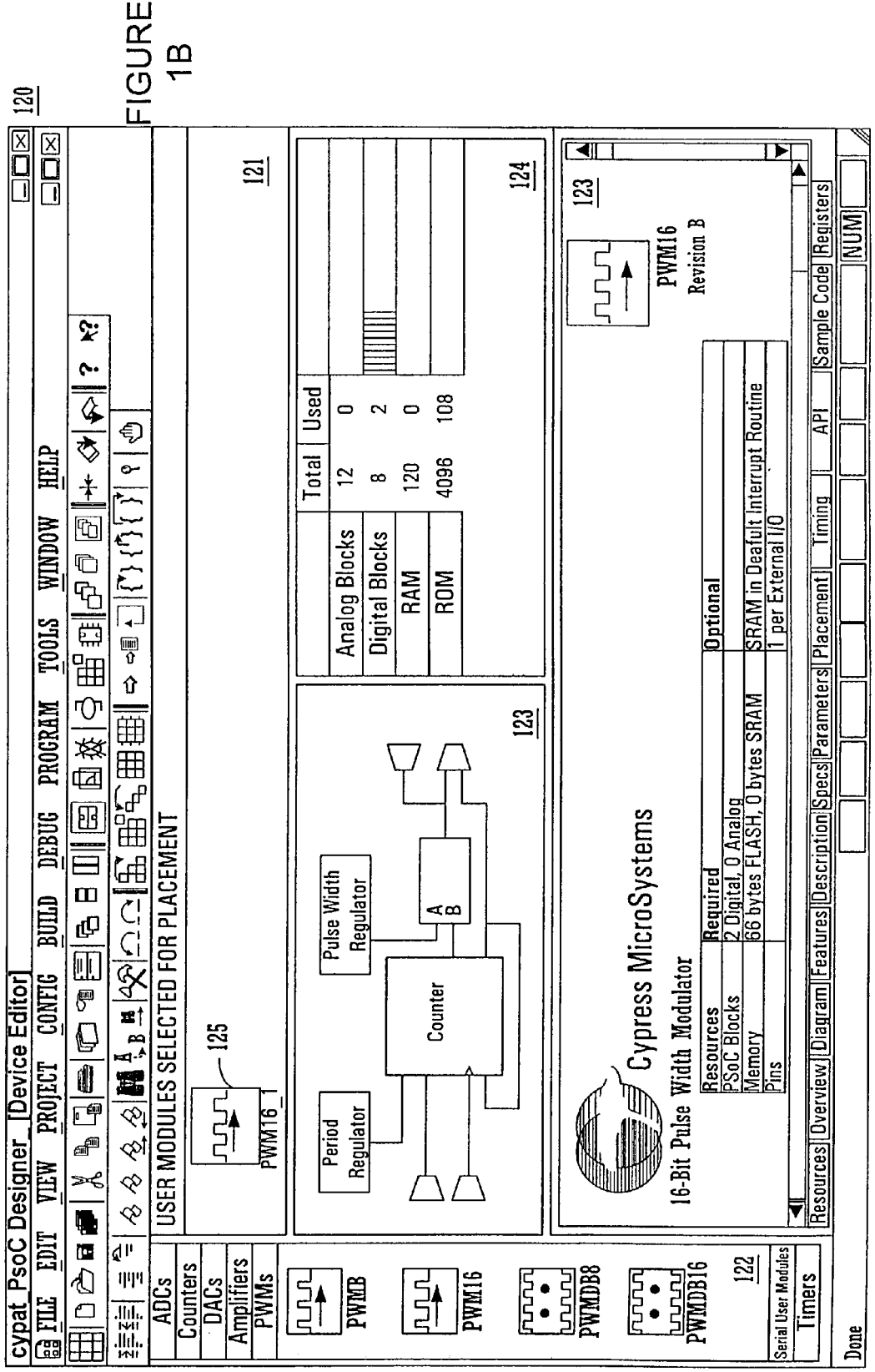
FIG. 1B shows a configuration interface window of an integrated design environment used for user module selection in accordance with an embodiment of the present claimed invention.

The PSOC DESIGNER DEVICE EDITOR subsystem of FIG. 1B is used for selection, placement and configuration of User Modules. FIG. 1B shows a configuration interface 120 in selection mode. The configuration subsystem is the subsystem in which the bulk of datasheet information is generated. Shown in FIG. 1B are a User Module Selection Window 121, User Module Window 122, User Information Windows 123, and a Resource Manager Window 124.

In an embodiment of the invention, a project begins with the selection of a target device such as the Cypress MicroSystems CY8C25122A microcontroller. The CY8C25122A is a member of the CY8C25xxx/26xxx family of PSOC™ microcontrollers that replaces many MCU-based system components with one single-chip, programmable device.

A single PSOC™ microcontroller offers a fast core, Flash program memory, and SRAM data memory with configurable analog and digital peripheral blocks in a range of convenient pin-outs and memory sizes. The driving force behind this innovative programmable integrated circuit comes from user configurability of arrays of programmable analog and digital blocks. These programmable blocks are analog and digital peripheral blocks that are customized by the placement and configuration of User Modules.

The configuration subsystem interface 120 is used to configure the target device. User Modules (represented by icons) may be selected from the User Module Window 122, which causes an icon to appear in the User Module Selection window 121. In this example, a pulse width modulator PWM 16_1 125 is shown as selected. Information regarding the PWM 16_1 125 is shown in the User Information Windows 123. The Resource Manager Window shows the target device resources that are used by the PWM 16_1.

Figure 1C:
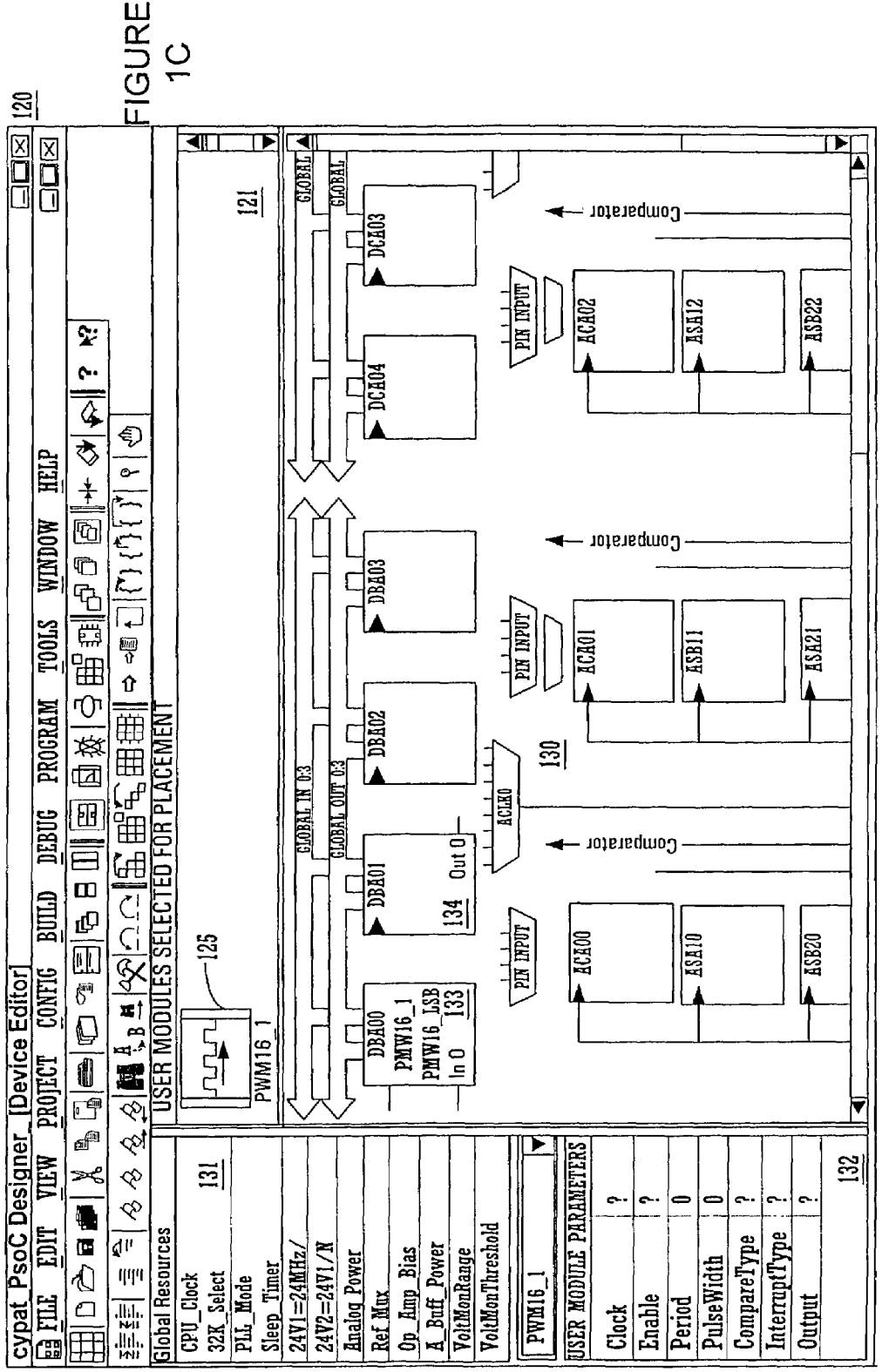
FIG. 1C shows a configuration interface window of an integrated design environment used for user module placement in accordance with an embodiment of the present claimed invention.

FIG. 1C shows the configuration subsystem interface 120 in placement mode, with a Placement Window 130, a Global Resources Window 131, and a User Module Parameters Window 132. User Modules shown in the User Module Selection window 121 are placed in the Placement Window 130. The placement of the PWM16_1 125 is indicated by the two digital blocks 133 and 134 shown in the Placement Window 130. Parameters and resources shown in the Global Resources Window 131 and User Module Parameters Window 132 are available for configuration by the designer.

Figure 1D:
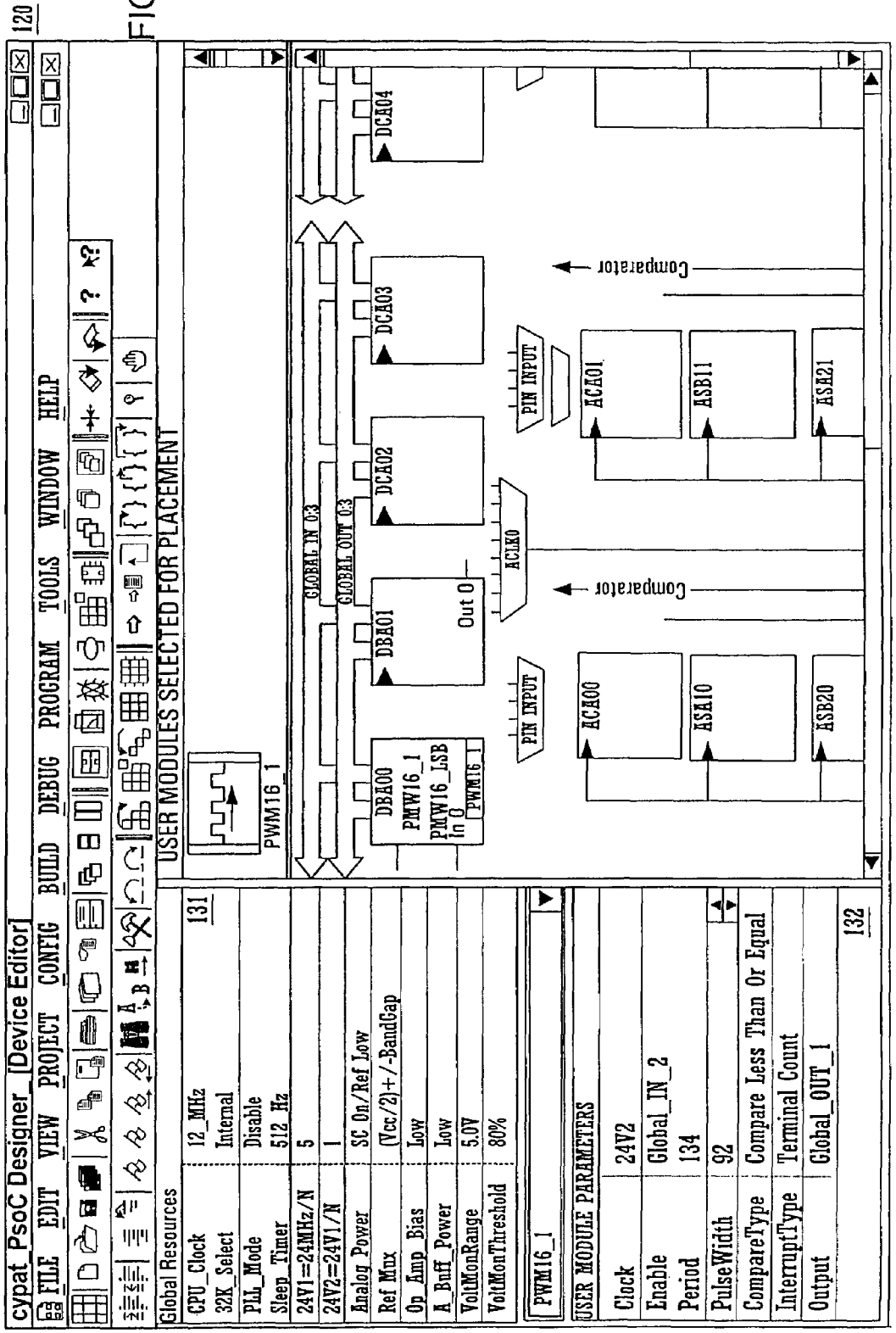
FIG. 1D shows integrated design environment window used for specification of module parameters and global resources in accordance with an embodiment of the present claimed invention.

FIG. 1D shows the configuration subsystem interface 120 with expanded Global Resources Window 131 and User Module Parameter Window in which resources and parameters have been set. For example, in the Global Resources Window 131, the CPU_Clock has been set with a frequency of 12 MHz and the Sleep Timer has been set with a frequency of 512 Hz. In the User Module Parameters Window the period has been set at 134 and the Pulse Width has been set at 92. The values entered by the designer, in addition to default values, are stored in an XML formatted database.

Figure 1E:
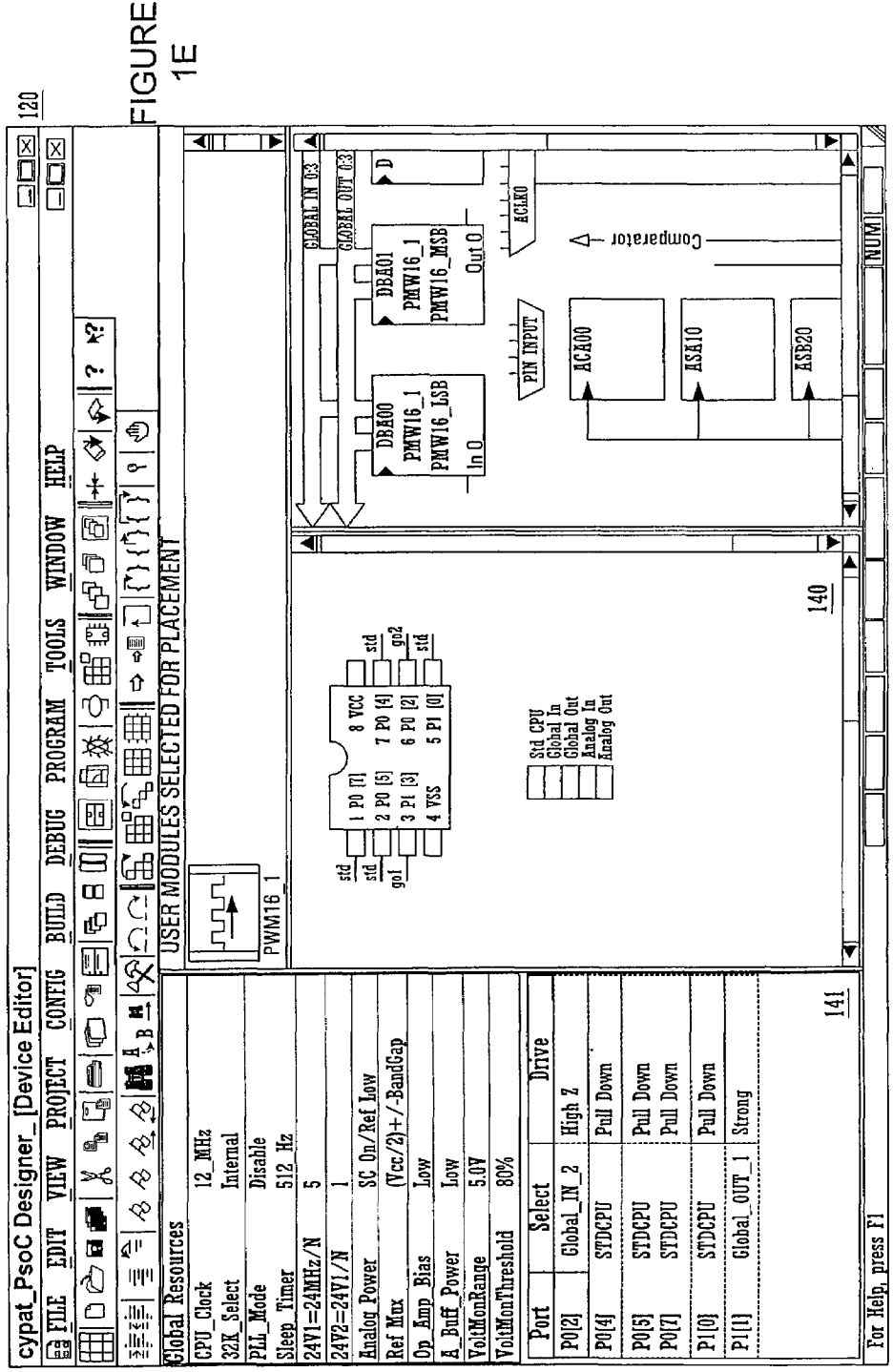
FIG. 1E shows a configuration interface window of an integrated design environment used for specifying device pinout in accordance with an embodiment of the present claimed invention.

FIG. 1E shows a configuration subsystem interface of an integrated design environment used for deploying module connections. Interconnections can be specified on the device in the placement mode of the configuration subsystem. User Module interconnections consist of connections to surrounding programmable analog and digital blocks, output bus, input bus, internal system clocks and references, external pins, and analog output buffers. Multiplexors may also be configured to route signals throughout the programmable analog and digital block architecture.

Referring again to FIG. 1E, a Pinout Window 140 and a Pinout Parameters Window 141 are shown. The Pinout window includes a diagram of the pin layout of the target device (e.g., the Cypress MicroSystems CY8C25122A). The Pinout Window accepts input specifying the connections for the programmable analog and digital blocks to the pins. In this example, there is only one User Module present, and thus there are no interconnections specified between multiple User Modules. Typically, there may be multiple User Modules with designer specified interconnects which would be stored in the project database. Some interconnects are designer specified, whereas others are generated automatically (e.g., the interconnection of programmable analog and digital blocks of a selected User Module.)

Further details regarding integrated circuits that are configurable from within an integrated design environment are described in a U.S. patent application titled "Programmable Microcontroller Architecture," by W. Snyder, filed on Oct. 22, 2001; the whole of which is incorporated herein by reference. Additionally, an integrated design environment in with which the present invention may be practiced is described in U.S. patent applications Ser. No. 09/972,003 (filed Oct. 5, 2001), Ser. No. 09/972,133 (filed Oct. 5, 2001), and Ser. No. 09/998,848 (filed Nov. 15, 2001); which are incorporated herein by reference.

Generally, Extensible Markup Language (XML) can be used as a human-readable, machine-understandable, general syntax for describing hierarchical data. XML documents are made up of storage units called entities, which contain either parsed or unparsed data. Parsed data is made up of characters, some of which form the character data in the document, and some of which form markup. Markup encodes a description of the document's storage layout and logical structure. XML provides a mechanism to impose constraints on the storage layout and logical structure. A software module called an XML processor is used to read XML documents and provide access to their content and structure.

Unlike HTML, element names in XML have no intrinsic presentation semantics. Extensible Stylesheet Language (XSL) is used to prepare stylesheets to handle presentation of XML data. XSL is capable of transforming XML to HTML.

A markup language such as Extensible Markup Language (XML) is not a programming languages per se, but combines text and information concerning the text in a document that may be used by another program. Markup languages are less abstract and bear a closer resemblance to natural language than programming languages, and thus have the potential to be more user friendly.

In an embodiment of the present invention, XML is used to create a description language for the hardware components used in the IDE as shown in FIGS. 1B–1E. The information concerning the hardware components is formatted as an XML database using the tags and attributes of the XML-based description language.

Figure 2:
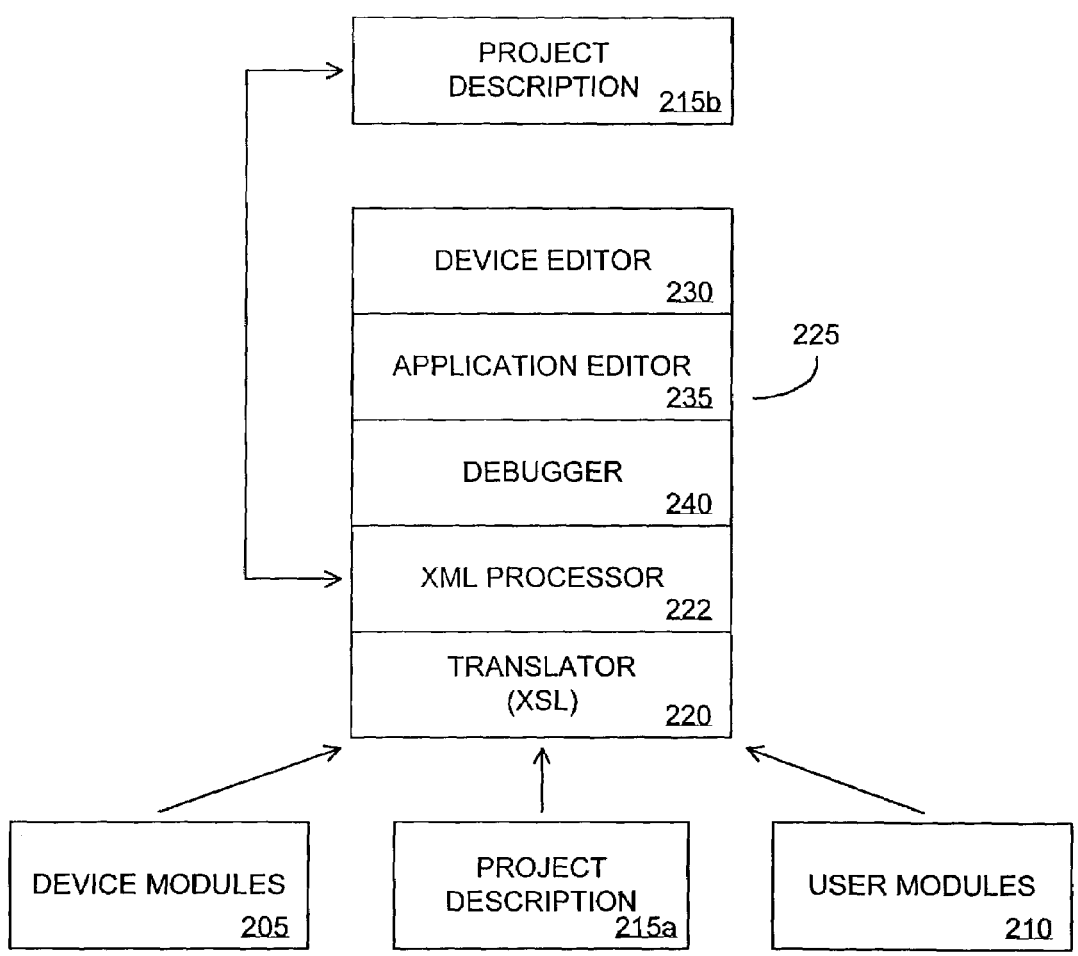
FIG. 2 shows an integrated design environment with an incorporated database translator in accordance with an embodiment of the present claimed invention.

FIG. 2 shows an integrated design environment 200 with a translator 220 incorporated in the main application 225. Three types of databases are shown: Device Modules 205, User Modules 210, and Project Descriptions 215*a* and 215*b*.

A Device Modules database includes data required by the main application 225 that is accessed automatically, without requiring user interaction. An example of a Device Module would be a database containing information on interconnects. A User Modules database includes data for User Modules that are selected by the user through interaction with the main application 225. Device Modules 205 and User Modules 210 are accessed by the main application 225 in response to interaction with the user, but they are not modified by the user interaction.

The project descriptions 215*a* and 215*b* are the database files that contain the design that is produced by the main application. Project Description 215*a* is different from Project Description 215*b* in that it represents a Project Description that is translated before being accessible to the main application 225. Project Description 215*b* represents a Project Description produced in the format native to the main application 225.

The main application 225 has a configuration subsystem 230, a source code editing subsystem 235, and a debugger subsystem 240, that are used to create a project description 215*b* through interaction with the user. The XML processor 222 extracts data from the databases translated by the translator 220. In this example, the translator 220 is based upon an extensible stylesheet language (XSL) stylesheet. The XML processor 222 also formats the Project Description 215*b*.

Incorporation of the translator 220 into the main application is desirable when database replacement is difficult. For example, a new version of the main application 225 may use a new format for Project Description 215*b* that is different from an earlier Project Description 215*a*. Incorporation of the translator for distribution with the new main application provides the user access to their earlier projects. The ability to load earlier Project Descriptions and save them in the new format allows for easier migration to the new version of the software tool.

Depending upon the relative frequency of revision, and the number of files involved, periodic replacement of a single translator 220 file in the main application 225 may be easier than replacing the database files associated with the Device Modules 205 and the User Modules 210. The translator 220 may be a dynamically linked library (DLL) or other file that can be independently replaced.

In addition to translating one database structure into another (adding or deleting data fields) or providing new data values, the translator 220 may also provide expansion of compact database files. The translator may include a cumulative recognition capability for all prior database formats, or it may be limited to a certain number of prior releases.

The incorporated translator 220 provides its services each time a data request is made by the main application 225. Translation and expansion typically do not result in permanent files being produced.

Figure 3:
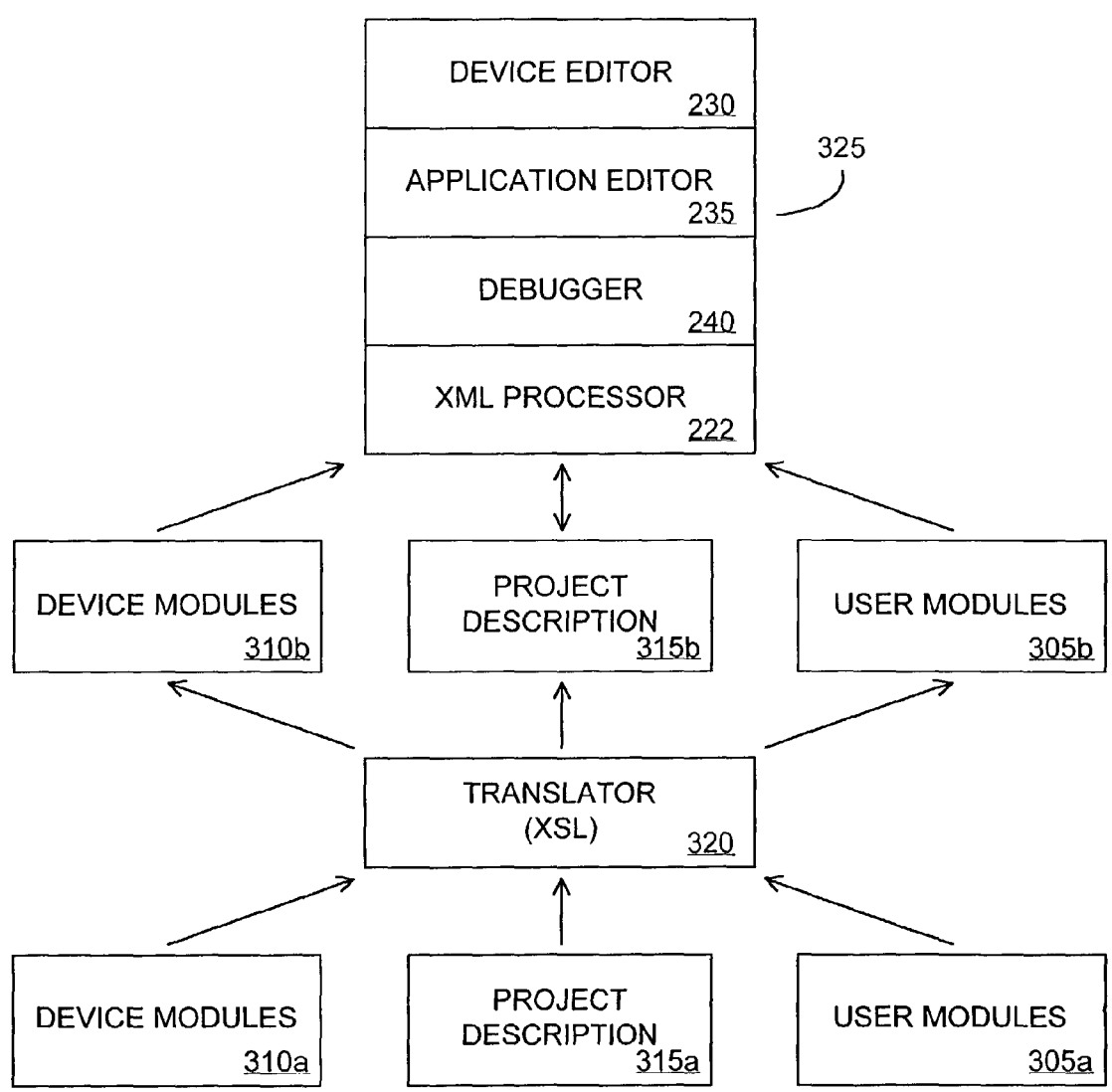
FIG. 3 shows an integrated design environment having a stand-alone database translator in accordance with an embodiment of the present claimed invention.

FIG. 3 shows an integrated design environment 300 having a database translator 320. The translator 320 is similar to the translator 220 of FIG. 2; however, the translator 320 is a stand-alone application that produces translated output files that can be accessed by the XML processor 222 of the main application 325.

The translator 320 may be run in batch mode, converting a first version of a Device Module 310a, Project Description 315a, or User Module 305a, to Device Module 310b, Project Description 315b, or User Module 305a, having the native format of the XML processor 222 of the main application 325. This mode allows for centralized conversion of Device Modules and User Modules with subsequent distribution. The use of a stand-alone translator also permits stricter document control within an organization by centralizing the translation of earlier project descriptions into the format of a new version of the main application 325.

As shown in FIG. 2 and FIG. 3, the translator replaces the former tight coupling between application and data with a flexible coupling that can easily accommodate changes in the database or application.

Figure 4:
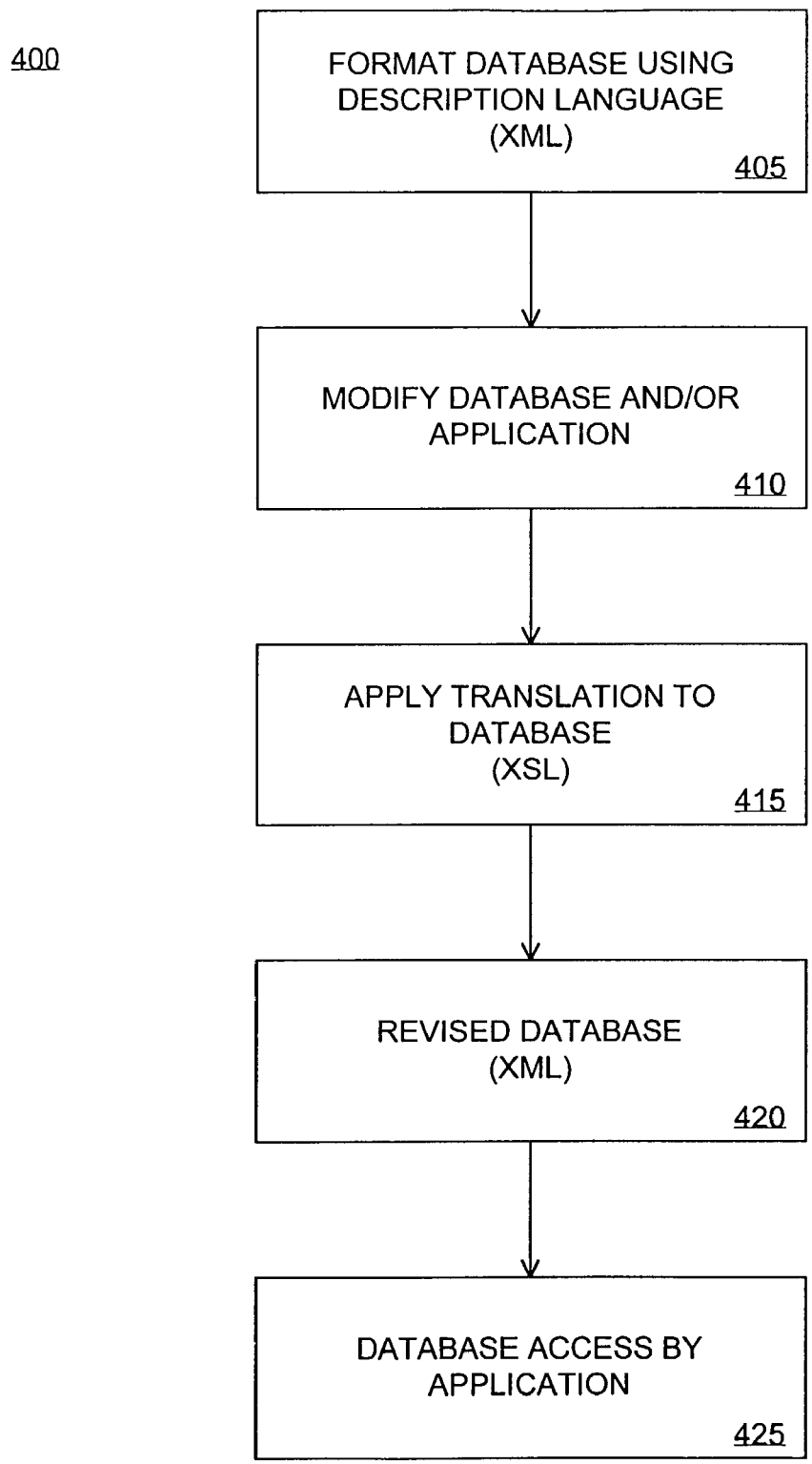
FIG. 4 shows flowchart for database translation in accordance with an embodiment of the present claimed invention.

FIG. 4 shows a general flowchart 400 for a database translation method in accordance with an embodiment of the present invention. In step 405, a database is formatted using a description language that is compatible to transformation by the use of stylesheets. An example of a description language is one based on XML. With respect to a device programming tool such as Cypress MicroSystems' PSOC DESIGNER™ software, the data associated with User Modules, Device Modules and Project Descriptions is stored in XML entities.

In step 410, a modification to either the application (programming tool) or a database (User Module, Device Module) is made. Since a Project Description is produced by the programming tool, the requirement for translating a Project Description is born out of a modification of the application. Modification of a database includes changing the structure or values of the data.

In step 415, a translation is applied to the database using a stylesheet. For databases using an XML based description language, the stylesheet is an XSL stylesheet. The translation may be reconciling a changed database with an unchanged application, a changed application with an unchanged database, or reconciling changes to both a database and the application.

In step 420, the revised database is produced and stored in computer memory. The revised database may be a discrete file that exists independently of the hardware executing the application, or it may be a virtual revision. A virtual revision is a translation that occurs during execution of the application that results in a translation being made available in memory, but not as a permanent file.

In step 425, the revised database is accessed by the application. The access may be from memory, or it may be from a file located on a non-volatile storage medium.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

The invention claimed is:

1. A computer implemented system for programming electronic devices comprising:

a first database formatted in a description language, said first database compatible with a first version of a software electronic device programming tool;

a translator comprising a stylesheet for transforming the structure and values of said first database to produce a second database that is formatted using the same said description language, said second database compatible with a second version of said software electronic device programming tool;

wherein said first database is accessed by said first version of said software electronic device programming tool for use in configuring and programming a microcontroller, and wherein said second database is accessed by said second version of said software electronic device programming tool for use in programming said microcontroller, wherein said second version is a later version of said first version.

2. The system of claim 1, wherein said first database comprises a user module database.

3. The system of claim 1, wherein said first database comprises a device module database.

4. The system of claim 1, wherein said translator is a stand-alone software program.

5. The system of claim 1, wherein said translator is integrated with said software electronic device programming tool.

6. The system of claim 1, wherein said description language is written in a compatible version of extensible markup language (XML).

7. The system of claim 1, wherein said stylesheet is a compatible version of an extensible stylesheet language (XSL) stylesheet.

8. A method for accessing data for a revised software electronic device programming tool comprising:

formatting data in a database using a description language, said database compatible with a first version of a software electronic device programming tool, wherein said database is accessed by said first version of said software electronic device programming tool for use in configuring and programming a microcontroller;

using a stylesheet to modify the structure and values of said database to produce a revised database that is formatted using the same said description language, said revised database compatible with a revised version of said software electronic device programming tool, wherein said revised version is a later version of said first version; and, accessing said revised database with said revised version of said software electronic device programming tool, wherein said revised database is for use in configuring and programming said microcontroller.

9. The method of claim 8, wherein said description language uses extensible markup language (XML).

10. The method of claim 8, wherein said stylesheet uses extensible stylesheet language (XSL).

11. The method of claim 8, wherein said data is derived from a user module.

12. The method of claim 8, wherein said data is derived from a device module.

13. The method of claim 8, wherein said revised database is a virtual revision, wherein said virtual revision occurs during execution of said software electronic device programming tool such that said revised database is available during said execution but is not a permanent file.

14. The method of claim 8, wherein said revised database is produced by a stand-alone software program.

15. A computer readable medium containing executable instructions which, when executed in a processing system, cause said processing system to perform a method of programming an electronic device comprising:

accessing a database formatted in a description language, said database compatible with a first version of a software electronic device programming tool, and wherein said database used with said first version of said software electronic device programming tool for use in configuring and programming a microcontroller;

using a stylesheet to modify the structure and values of said database to produce a revised database that is formatted in the same said description language, said revised database compatible with said revised version of said software electronic device programming tool, wherein said revised database is used with said revised version of said software electronic device programming tool, wherein said revised version is a later version of said first version;

accessing said revised database by said revised version of said software electronic device programming tool; and, configuring and programming said microcontroller using said revised version of said software electronic device programming tool.

16. The computer readable medium of claim 15, wherein said method further comprises receiving input from a user through a graphical user interface.

17. The computer readable medium of claim 15, wherein said description language uses extensible markup language (XML).

18. The computer readable medium of claim 15, wherein said stylesheet uses extensible stylesheet language (XSL).

19. The computer readable medium of claim 15, wherein said using a stylesheet to modify the structure or values of said database to produce a revised database is implemented by a stand-alone program.

* * * * *